United States Patent [19]
Sato et al.

[11] Patent Number: 5,906,516
[45] Date of Patent: *May 25, 1999

[54] CARD-IN TYPE CONNECTOR

[75] Inventors: Shigeru Sato, Yotsukaido; Toshiyasu Ito, Togane, both of Japan

[73] Assignee: Yamaichi Electronics Co., Ltd., Tokyo, Japan

[*] Notice: This patent is subject to a terminal disclaimer.

[21] Appl. No.: 08/775,249

[22] Filed: Dec. 30, 1996

[30] Foreign Application Priority Data

Dec. 28, 1995 [JP] Japan .................................. 7-353189

[51] Int. Cl.$^6$ .................................................. H01R 23/70
[52] U.S. Cl. .......................... 439/630; 439/945; 439/946
[58] Field of Search .................................... 439/630, 945, 439/946.2, 638; 361/684, 737, 752

[56] References Cited

U.S. PATENT DOCUMENTS

| | | | |
|---|---|---|---|
| 5,457,601 | 10/1995 | Georgopulos et al. | 439/946.2 |
| 5,463,531 | 10/1995 | Choon et al. | 361/752 |
| 5,572,408 | 11/1996 | Anhalt et al. | 361/752 |
| 5,650,916 | 7/1997 | Osaki et al. | 361/737 |
| 5,668,365 | 9/1997 | Ito et al. | 235/486 |
| 5,679,007 | 10/1997 | Potdevin et al. | 439/945 |

*Primary Examiner*—Gary Paumen
*Assistant Examiner*—Tho D. Ta
*Attorney, Agent, or Firm*—Wenderoth, Lind & Ponack, L.L.P.

[57] ABSTRACT

A card-in type connector is to be inserted into an electronic device in order to add a memory function to the electronic device. A contact to be contacted with a memory card is disposed within a thin and flat type insulative case into which the memory card is withdrawably inserted and, a pair of spaced apart, parallel cantilever arms extend forwardly from a distal end of the thin and flat type insulative case. A wiring board is interposed between the cantilever arms and an end portion of the contact is connected to a rear end portion of the wiring board by soldering. A connecting device to be withdrawably inserted into a connecting device on the electronic device side is interposed between front end portions of the cantilever arms, and an end portion of a contact of the connecting device is connected to a front end portion of the wiring board by soldering.

6 Claims, 7 Drawing Sheets

CARD-IN TYPE CONNECTOR

BACKGROUND OF THE INVENTION

1. Field of the Invention

This invention relates to a card-in type connector designed to be used by inserting a memory card into a given electronic device such as a computer, a word processor or the like in order to feed data thereto.

2. Brief Description of the Prior Art

Generally, a memory card of this type is designed to be inserted into an inlet port of a given electronic device such as a personal computer, a word processor or the like and used for the purpose of adding a required memory function thereto. For this purpose, the memory card has specifications made in accordance with the standards.. Because the memory cards are of a single function type, the function which can be added by a single card is limited. For this reason, users must own a plurality of memory cards.

In order to obviate the above-mentioned inconvenience, it can be contemplated that a card-in type connector which is formed in accordance with the standards as a parent card is preliminarily prepared and replaceable memory cards (child card) having a memory element are selectively inserted into the connector and then the parent card containing a memory card may be inserted into the given electronic device.

Generally speaking, electronic elements incorporated in the memory card and the card-in type connector into which the memory card is to be inserted are readily broken by mechanical impacts, high-frequency noises and static current. Therefore, it is necessary to work out an effective counter-measure.

In addition, it is a problem to effectively arrange a thin and flat type insulative case containing contacts therein and designed for receiving a memory card inserted therein, a control wiring board connected to the contacts, and a connecting device connected to the wiring board and subjected to connection with a given electronic device, while satisfying a requirement for designing the card-in type connector thinner in physical size.

The present invention has been accomplished in view of the above situation.

SUMMARY OF THE INVENTION

It is, therefore, a general object of the present invention to provide a card-in type connector in which the problems inherent in the prior art can effectively be obviated.

In order to achieve the above object, there is essentially provided a card-in type connector which is to be inserted into an electronic device in order to add a memory function to the electronic device. A contact to be contacted with a memory card is disposed within a thin and flat type insulative case into which the memory card is withdrawably inserted, and a pair of spaced apart, parallel cantilever arms extend forwardly from a distal end of the thin and flat type insulative case. A wiring board is interposed between the cantilever arms and an end portion of the contact is connected to a rear end portion of the wiring board by soldering. A connecting device to be withdrawably inserted into a connecting device on the electronic device side is interposed between front end portions of the cantilever arms, and an end portion of a contact of the connecting device is connected to a front end portion of the wiring board by soldering.

Each of the cantilever arms is preferably provided on a front end portion thereof with an engagement portion for preventing the connecting device from moving forwardly and backwardly.

It is preferred that upper and lower surfaces of the thin and flat type insulative case, the wiring board and the connecting device are covered with upper and lower shield plates, respectively, and that the cantilever arms are interposed between left and right end portions of the upper and lower shield plates for the purpose of reinforcement.

Other objects and advantages of the invention will become more apparent during the course of the following description when taken in connection with the accompanying drawings.

DETAILED DESCRIPTION OF THE INVENTION

The present invention will now be described in detail with reference to the accompanying drawings which constitute a part of the specification.

Figure 1A:
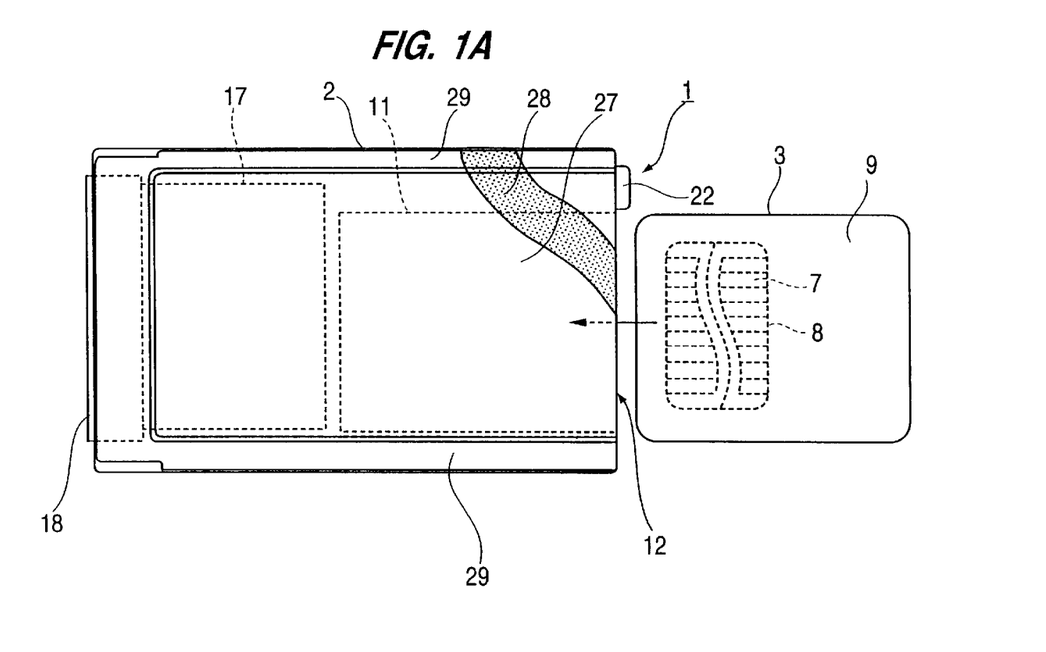
FIG. 1(A) is a plan view, partly cut-away, showing a card-in type connector according to one preferred embodiment of the present invention.
Figure 1B:
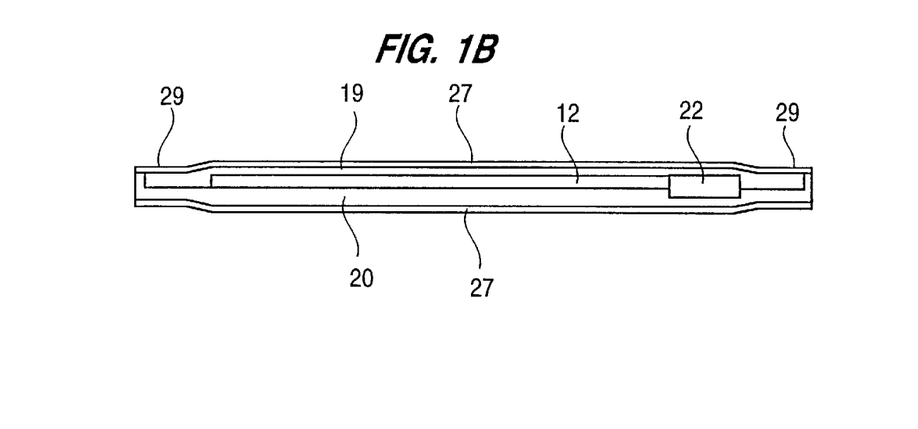
FIG. 1(B) is a front view thereof.
Figure 2:
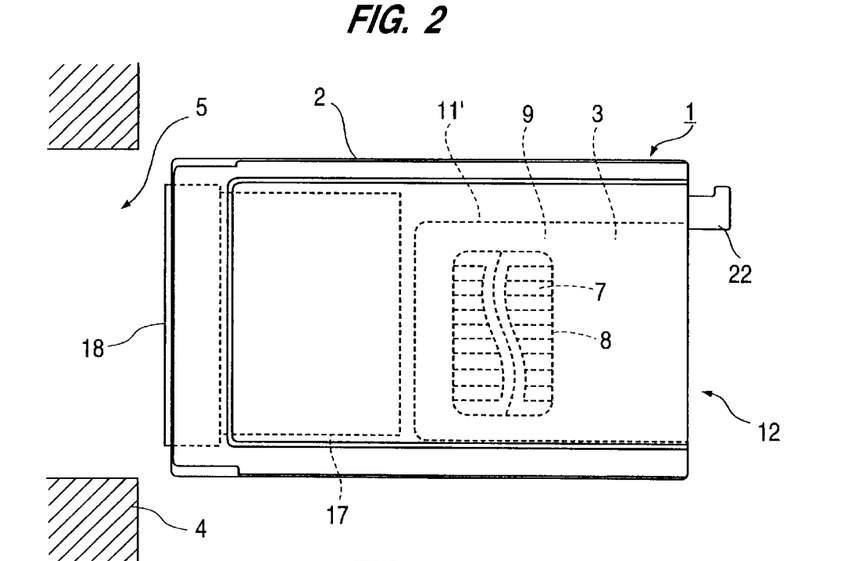
FIG. 2 is a plan view of the card-in type connector with a memory card already inserted therein.
Figure 3:
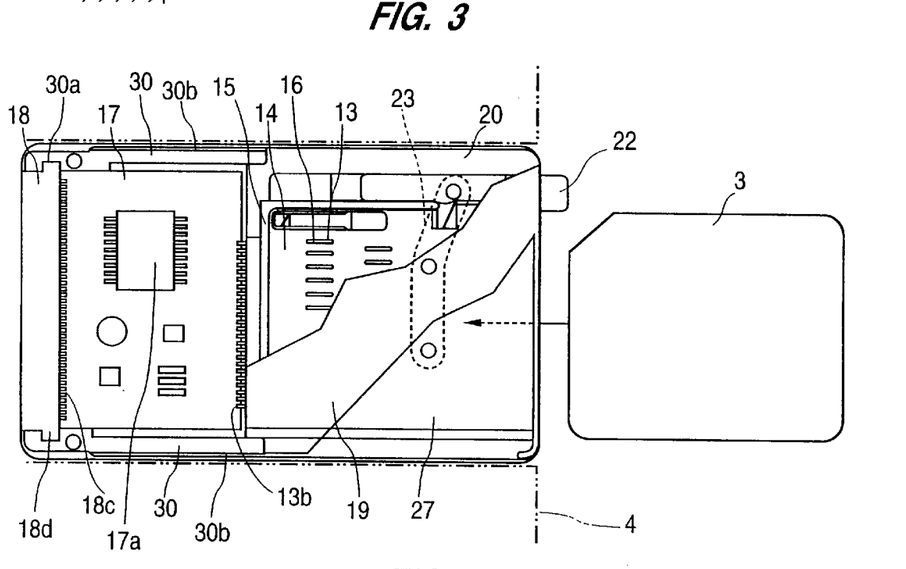
FIG. 3 is a plan view showing an internal construction of the card-in type connector before the memory card is inserted therein.

As shown in FIGS. 1 through 3, this invention relates to a card-in type connector 1. The connector 1 is designed to be inserted into an inlet port 5 of a given electronic device such as a personal computer, a word processor or the like for the purpose of adding or changing a predetermined memory function with respect to the electronic device. The card-in type connector 1 comprises a connector body 2 which can be withdrawably inserted into the inlet port 5 of the electronic device 4, and a replaceable memory card 3 which can be withdrawably inserted into the connector body 2.

Figure 4:
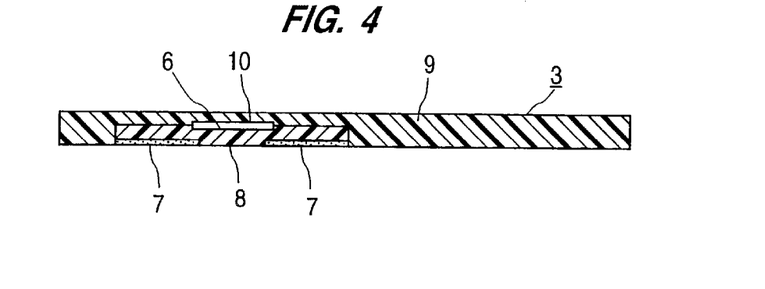
FIG. 4 is a sectional view of the memory card.

As shown in FIGS. 1(A) and 4, the memory card 3 comprises an IC retaining plate 8 with an IC chip 6 as a memory element and leads 7 as external terminals thereof, intimately attached to an outer surface of the IC retaining plate 8, and a base plate 9 to which the IC retaining plate 8 is intimately attached.

The base plate 9 is a carrier having a rectangular configuration which allows the memory card 3 to be inserted into an insert port of the connector body 2. The IC chip 6 is selectively bonded to the base plate 9 by the retaining plate 8.

The base plate 9 is provided with a recess 10 formed in a top surface thereof. The IC retaining plate 8 is bonded to an inner bottom surface of the recess 10. By virtue of such a complicated construction, the IC retaining plate 8 does not project from the top surface of the base plate 8.

Figure 5A:
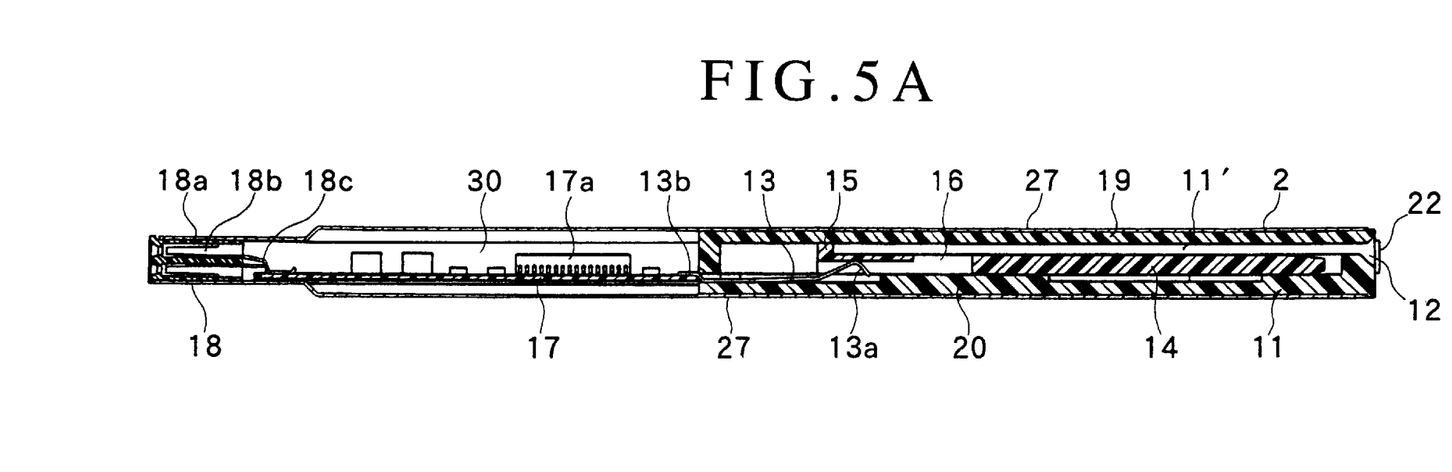
FIG. 5(A) is a sectional view of the card-in type connector before the memory card is inserted therein.
Figure 5B:
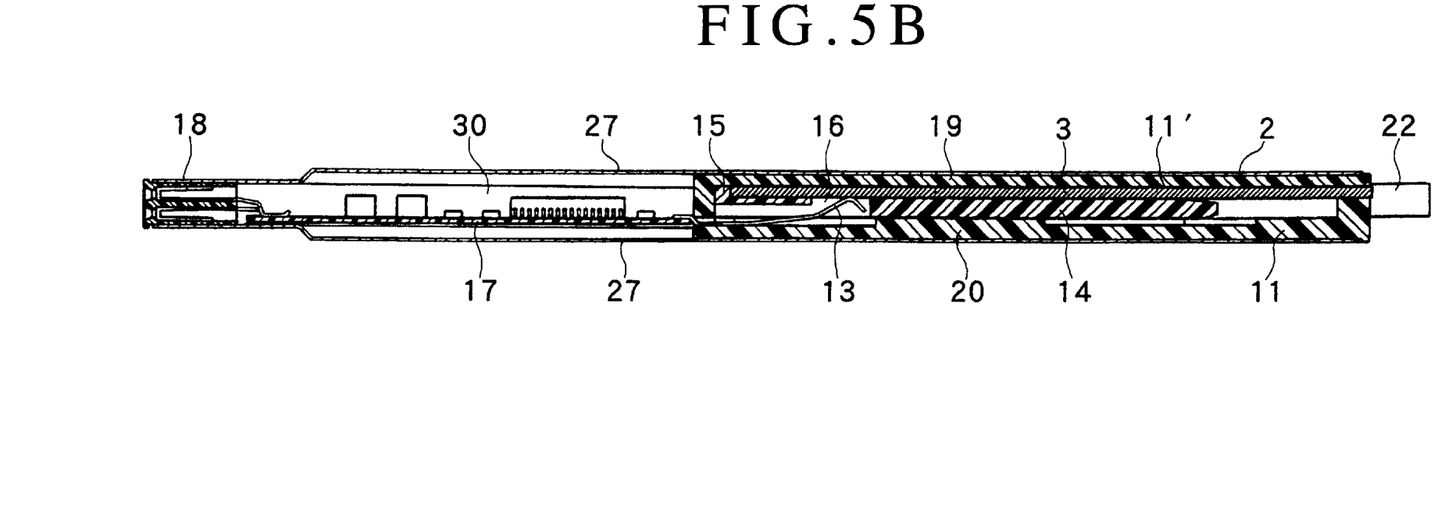
FIG. 5(B) is a sectional view of the card-in type connector after the memory card is inserted therein.
Figure 6:
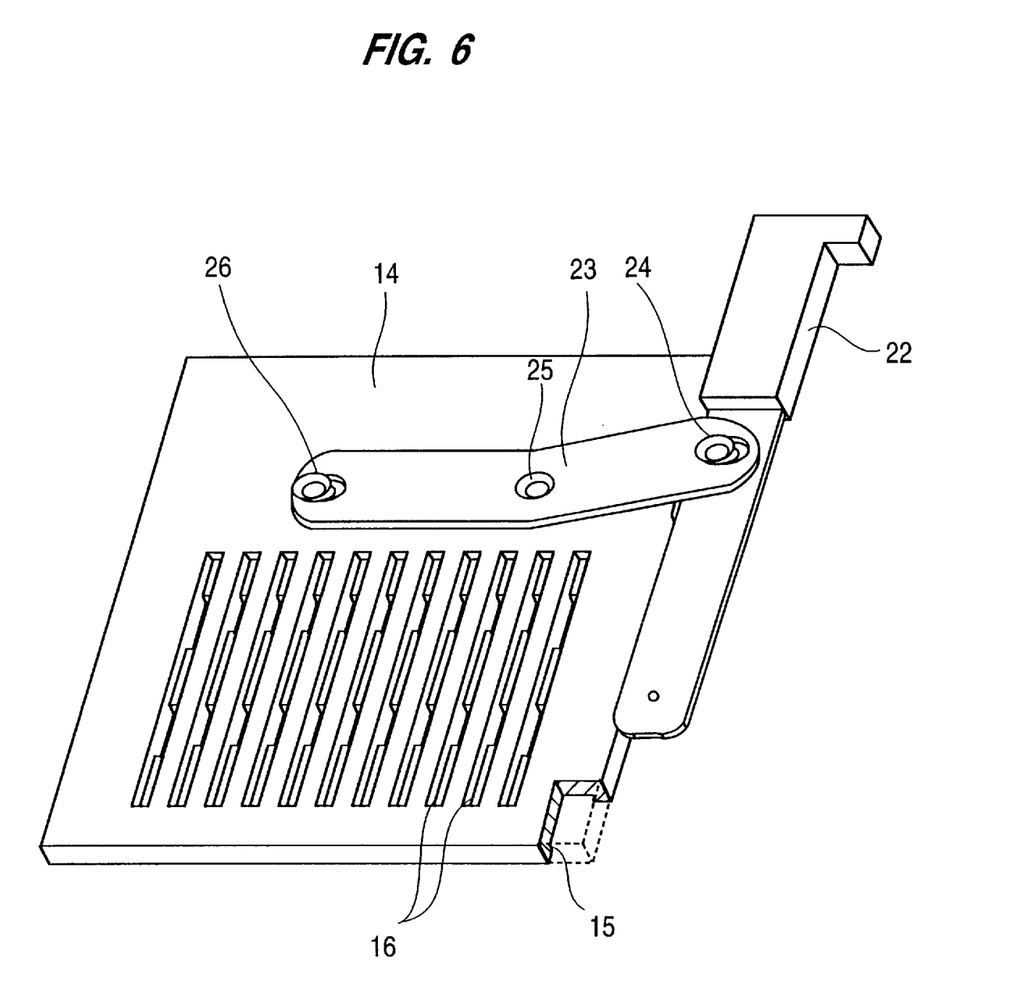
FIG. 6 is a perspective view of a card ejection means in the card-in type connector when viewed from the back of the card-in type connector.

As shown in FIGS. 3, 5(A) and 5(B), as well as elsewhere, the connector body 2 has a card receiving portion 11' for receiving the memory card 3 through a card insert port 12 formed in one end thereof.

The memory card 3 is inserted into the receiving portion 11' defined in the connector body 2 through the card insert port 12 so that the memory card 3 can physically contact contacts 13 arranged in the receiving portion 11'. When inserted into the electronic device, the memory card 3 feeds the card-specific recording data recorded in the IC chip 6 to the electronic device through the contacts 13 which are in contact with the leads 7 of the memory card 3.

In the connector body 2, the card receiving portion 11' is formed by a flat and thin type insulative case 11 having a rectangular outer configuration, and the card insert port 12 is open at a front end portion of the flat and thin type insulative case 11.

The thin and flat type insulative case 11 contains therein a card tray 14 which slides following the action of card insertion within the IC receiving portion 11'. The thin and flat type insulative case 11 is also provided therein with the contacts 13 for connection with a data processing circuit which is resiliently shifted between a contacting position and a contact-releasing position by the sliding movement of the card tray 14.

One end of each contact 13 is soldered to a top surface of a wiring board 17 disposed forwardly of the thin and flat type insulative case 11 and connected to the data processing circuit which is constituted by a control element to be loaded on the wiring board 17.

A connecting device 18 withdrawably inserted into a connecting device on the side of the electronic device 4 is disposed on a front end of the wiring board 17 and is in connection with the wiring board 17. Owing to this arrangement, the memory card 3 is connected to the electronic device 4 through the contacts 13, the wiring board 17 and the connecting device 18.

As shown in FIGS. 5(A) and 5(B), when the memory card 3 is inserted into the card receiving portion 11' through the card insert port 12, the card 3 is supported on an upper surface of a bottom plate of the card tray 14 with a front end of the card 3 abutted with a front abutment 15 formed on a front end of the tray 14 so that the tray 14 can slide forwardly together with the card 3.

Specifically, the card tray 14 slides from a rear sliding position shown in FIG. 5(A) to a front sliding position as shown in FIG. 5(B) as the card is inserted. When the card tray 14 is located in the rear sliding position of FIG. 5(A), the contacts 13 are in abutment with a lower surface of the bottom plate of the card tray 14 and shifted downwardly (i.e., the contacts 13 are in a contact releasing state). When the card tray 14 slides to the front sliding position of FIG. 5(B), the contacts 13 slide on the lower surface of the bottom plate of the card tray 14 and are shifted upwardly to an upper surface of the bottom plate through a contact port 16 formed in the bottom plate. By this shifting, the contacts 13 are brought into contact under pressure with corresponding leads 7 of the memory card 3.

The connector body 2 further contains a means for ejecting the memory card 3. This card ejection means is adapted to move the card tray 14 (this card tray 14 also serves as a contact opening- and closing-slide plate) in a direction opposite to the card insertion direction with the front end of the card 3 abutted with the front abutment 15 until the card 3 is ejected outwardly from the card insert port 12. The card 3 thus ejected can easily be removed.

Figure 7:
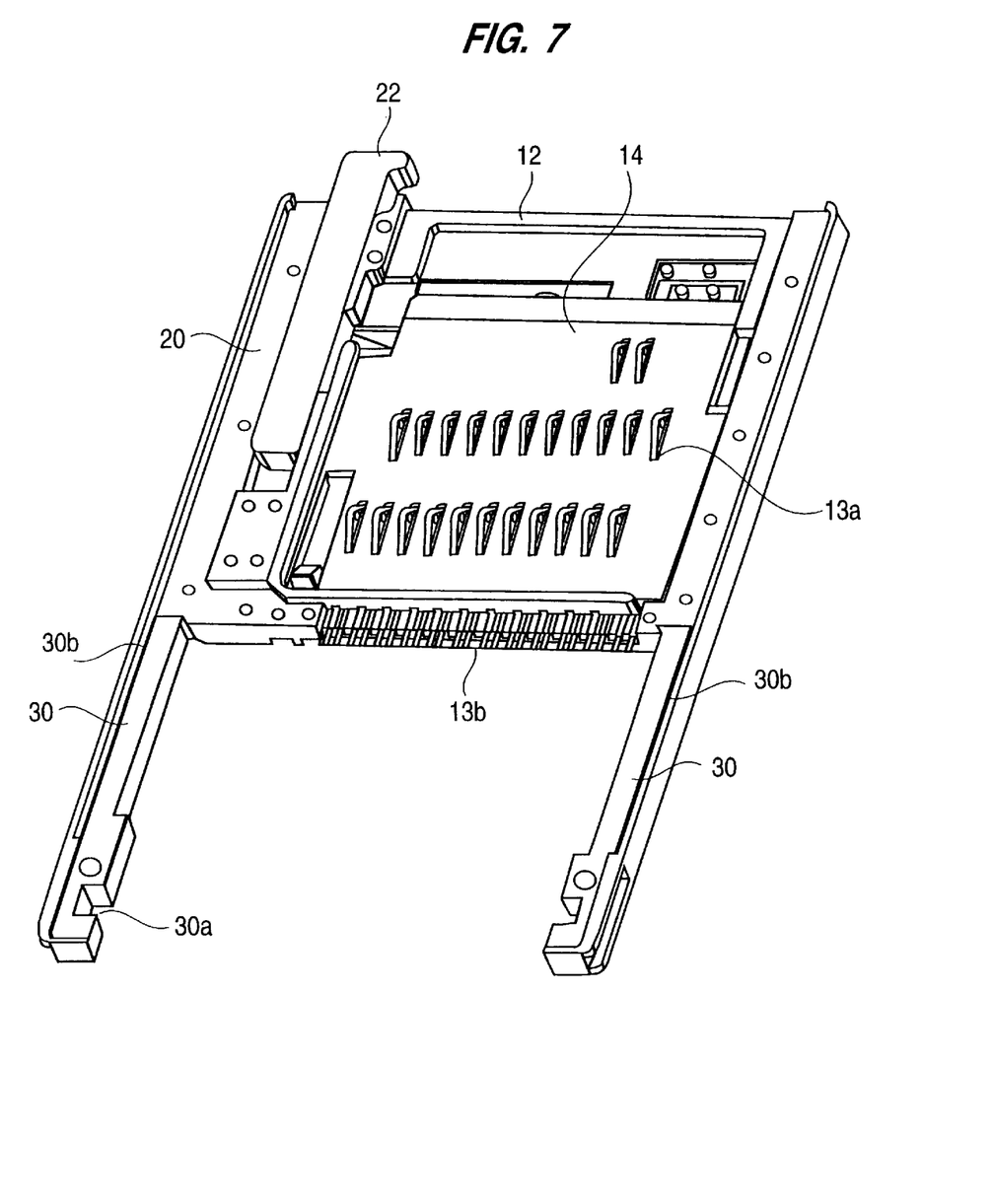
FIG. 7 is a perspective view showing an internal construction of a thin and flat type insulative case which constitutes the card-in type connector.

For example, FIGS. 3 and 7 show concrete examples of the ejection means. In the thin and flat type insulative case 11, the card receiving portion 11' is formed between an upper surface plate 19 and a lower surface plate 20 which are formed of an insulative plate. The card tray 14 is contained within the card receiving portion 11'. The card tray 14 is designed to slide forwardly and backwardly with the upper and lower surface plates 19 and 20 serving as a guide means.

More specifically, for the purpose of guiding the tray 14 to slide, the bottom plate for loading thereon the card 3 of the card tray 14 is superimposed upon an inner surface of the lower surface plate 20, and the front abutment 15 for restricting the front end edge of the card is held in abutment with the inner surface of the upper surface plate 19.

On the other hand, an ejection lever 22 is disposed adjacent to one side of the card tray 14, and the ejection lever 22 and the card tray 14 are linked together by a link 23 so that the ejection lever 22 can be slid in the card insertion direction. As a consequence, when the ejection lever 22 is pushed, the card tray 14 is moved through the link 23.

For example, one end of the link 23 is pivotally joint to the ejection lever 22 and the other end is pivotally joint to the card tray 14. An intermediate portion of the link 23 is pivotally supported by the lower surface plate 20 of the insulative case 11, and a rear end of the ejection lever 22 projects from a rear end of the case 11 at a location adjacent to the card insert port 12, thereby forming a control portion.

A pushing force applied to the ejection lever 22 is transmitted to the link 23 through a pivot joining point 24, the link 23 is turned about a pivot point 25, and this turning force is applied to a pivot forming point 26 to move the card tray 14. The movement of the card tray 14 in a direction opposite to the card insertion direction causes the front abutment 15 to push the card 3 so that a rear end of the card 3 projects outwardly from the card insert port 12.

On the contrary, when the card 3 is inserted, the card tray 14 is moved in the card insertion direction and this moving force is given to the ejection lever 22 through the link 23, so that the lever 22 is pushed into a standby position where the lever 22 is located before it is pushed and awaits the next ejecting operation. The memory card 3 can be replaced in the manner as described above.

As described in the foregoing, the connector body 2 includes a card tray 14 and contacts 13 disposed within the thin and flat type insulative case 11. It further includes at the front end of the case 11 the wiring board 17 for loading thereon the control element connected to the contacts 13, and the connecting device 18 connected to the front end of the wiring board 17. By withdrawably inserting the connector body 2 into the electronic device through the connecting device 18, the connector body 2 can be connected to the data processing circuit in the electronic device. The outer surface of the insulative case 11 is covered with two shield plates 27 which are formed of conductive plates.

FIGS. 3 and 7 through 10 show a specific means for arranging the thin and flat type insulative case 11, the connecting device 18 and the shield plates 27, which constitute the connector body 2 so that they occupy the relative positions as mentioned above, and assembling them. This will be described hereinafter.

The upper surface plate 19 and the lower surface plate 20 of the thin and flat type insulative case 11 are formed of separate parts, respectively. By closing the upper and lower surface plates 19 and 20, the thin and flat type insulative case 11 is formed.

Figure 8:
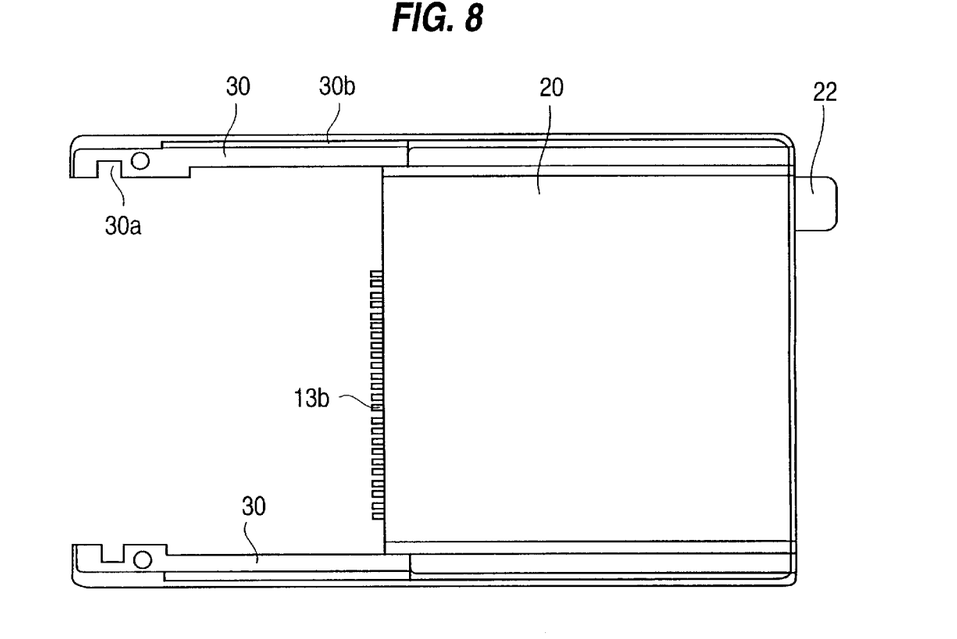
FIG. 8 is a plan view of the connector body in which the internal construction is covered with an upper surface plate.

As shown in FIGS. 7 and 8, as well as elsewhere, a pair of spaced apart, parallel cantilever arms 30 extend forwardly from a front end portion of the thin and flat type insulative case 11. Rear ends of the cantilever arms 30 are integrally connected to the insulative case 11 and front ends thereof are free ends, respectively. For example, as shown in FIG. 7, as well as elsewhere, the pair of cantilever arms 30 are connected to a front end of the lower surface plate 20. The cantilever arms 30 and the lower surface plate 20 are integrally formed by an insulative material.

A space formed between the pair of cantilever arms 30 serves as a space in which the wiring board 17 is disposed. The wiring board 17 is interposed between the pair of cantilever arms 30 such that the cantilever arms 30 restrict the left and right end portions of the wiring board 17 so that leftward and rightward movement of the wiring board 17 is restricted.

End portions of the contacts 13 are soldered to a rear end edge portion of the wiring board 17 in order to be connected to a circuit pattern on the wiring board 17 and an electronic part 17a mounted on the wiring board 17. The contacts 13 have pressure contacting portions 13a extending backwardly into the card receiving portion 11' of the case 11 from the front end portion of the insulative case 11, i.e., from the front end portion of the lower surface plate 20, and terminal pieces 13b projecting forwardly from the front end portion of the case 11. Each terminal piece 13b is connected to the rear end portion of the wiring board 17 interposed between the cantilever arms 30 by soldering.

Figure 9:
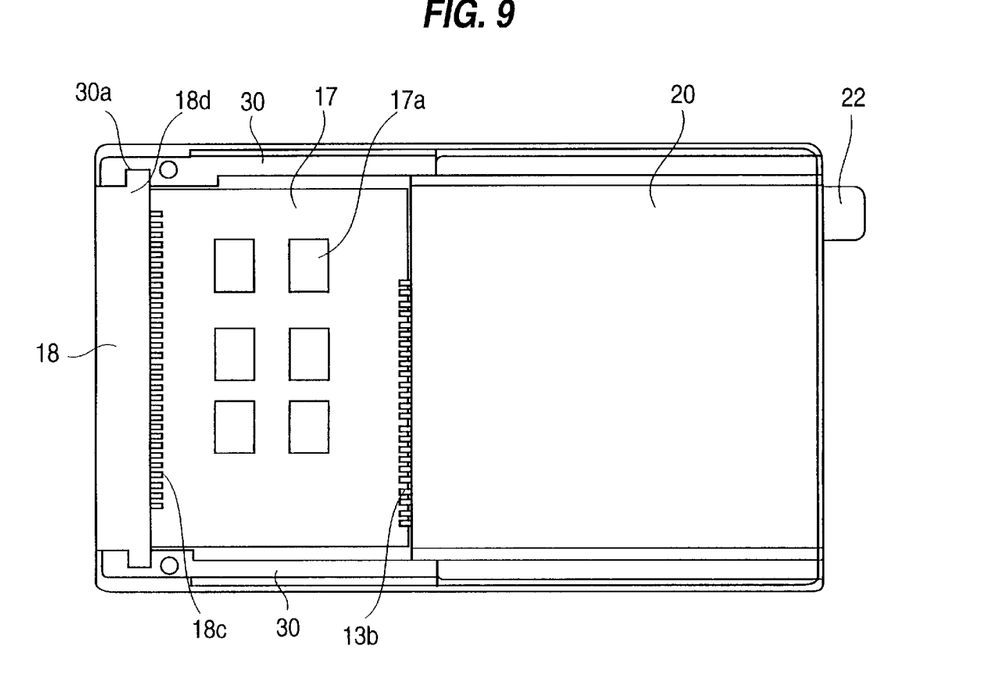
FIG. 9 is a plan view showing the connector body with a wiring board and a connecting device built therein.

As shown in FIGS. 5 and 9, as well as elsewhere, the connecting device 18 to be withdrawably inserted into a connecting device on the electronic device side is interposed between the front end portions of the cantilever arms 30. The connecting device 18 has a plurality of contacts 18b within an elongated insulative connecting device body 18a. Rear ends of the contacts 18b are allowed to project from a rear end face of the insulative connecting device body 18a, and projecting terminal pieces 18c are soldered to the front end portion of the wiring board 17 so as to be connected to the circuit pattern and the electronic part 17a.

Accordingly, the wiring board 17 is soldered at its front end portion to the terminal pieces 18c and at its rear end portion to the terminal piece 13b, and supported between the terminal pieces 18c and 13b in a suspended fashion, thereby interconnecting the contacts 13, the wiring board 17 and the connecting device 18.

Opposite end portions of the insulative connecting device body 18a of the connecting device 18 are capable of engaging distal end portions of the cantilever arms 30, so that the connecting device 18 is correctly positioned and prevented from moving forwardly and backwardly. For example, the insulative connecting device body 18a is provided on opposite ends thereof with keys 18d projecting sidewardly. On the other hand, the cantilever arms 30 are provided in inner surfaces of the distal end portions with key grooves 30a. By fitting the keys 18d into the key grooves 30a, the connecting device 18 is correctly positioned.

By this, the wiring board 17 is disposed on the front end of the thin and flat type insulative case 11, and the connect-ing device 18 is disposed on the front end of the wiring board 17. Those three component members 11, 17 and 18 are juxtaposed on the same plane. The connecting device 18 and the wiring board 17 are disposed at predetermined positions between the pair of cantilever arms 30 extending from the front end of the thin and flat type insulative case 11 in parallel relation.

As described above, by retaining the connecting device 18 on the thin and flat type insulative case 11 by the cantilever arms 30, the wiring board 17 can be disposed between the thin and flat type insulative case 11 and the connecting device 18 in a static fashion so that no tensile force is applied between the case 11 and the connecting device 18.

As shown in FIGS. 3, 5(A) and 5(B), as well as elsewhere, the shield plates 27 cover the top and bottom surfaces of the insulative case 11, wiring board 17 and connecting device 18. The shield plates 27 have an insulative connecting device body of the connecting device 18 disposed between the inner surfaces of their front end portions. Accordingly, the inner surfaces of the front end portions of the shield plates 27 are superimposed upon and contacted with the upper and lower surfaces of the insulative connecting device body of the connecting device 18. The connecting device 18 is held between the shield plates 27.

As shown in FIG. 1, the shield plates 27 cover the outer surfaces of the upper surface plate 19 and lower surface plate 20 of the thin and flat type insulative case 11 and bonded to the outer surfaces of the upper and lower surface plates 19 and 20 through an adhesive 28.

Figure 10:
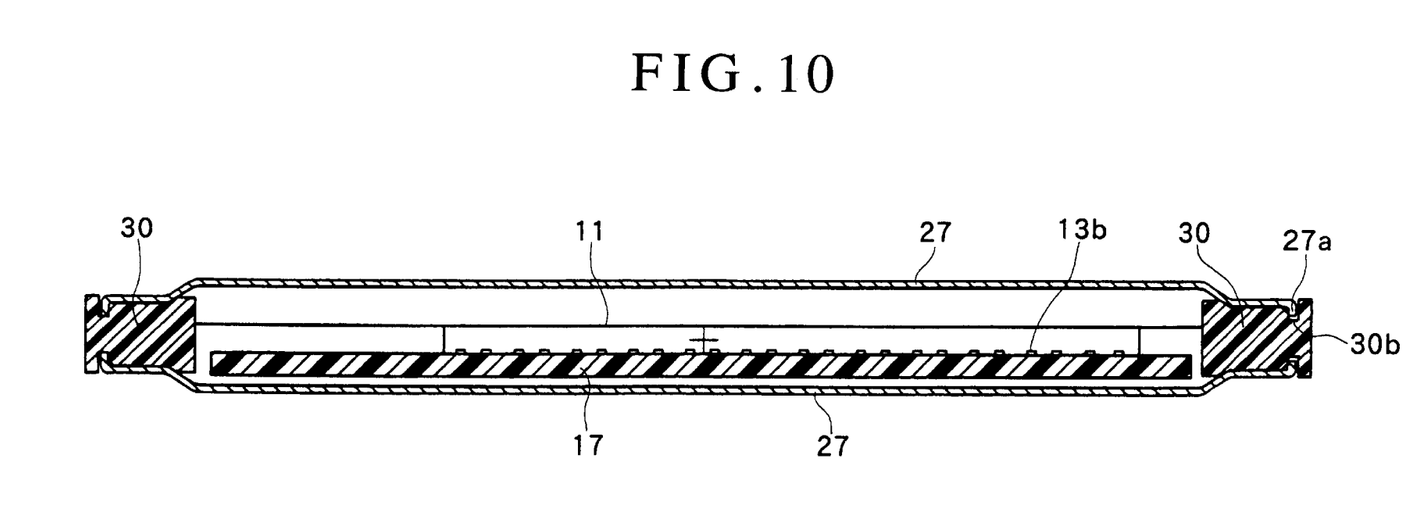
FIG. 10 is a sectional view showing a pair of left and right cantilever arms of the connector body.

As shown in FIG. 10, the pair of left and right cantilever arm 30 are interposed along and between the left and right end portions of the upper and lower shield plates 27. The upper and lower shield plates 27 are supported by the left and right cantilever arms 30. By this, a space for interposing the wiling board 17 between the upper and lower shield 27 is obtained.

The upper and lower shield plates 27 are supported at the left and right edge portions of central portions thereof by the left and right cantilever arms 30, at the front ends by the upper and lower surfaces of the connecting device 18, and at the rear ends by the upper and lower surfaces of the insulative case 1. Owing to this arrangement, a space for receiving the wiring board 17 is defined among those four component members 11, 30, 18 and 27.

As shown in FIGS. 8 and 10, as well as elsewhere, slits 30b are formed in upper and lower surfaces of the left and right cantilever arms 30 in the longitudinal direction (forward and backward direction). Similarly, the slits 30b are formed in the upper and lower surfaces of the insulative case 1 continuously over the left and right end edges. The left and right end edge portions 27a of the upper and lower shields 27 are fitted in those slits 30b, so that the upper and lower shields 27 are correctly positioned relative to the insulative case 1.

Although stainless plates are used as the shield plates 27 in this embodiment, other metal plates may also be used as the shield plates 27. Also, conductive plates obtained by respectively intimately adhering conductive layer to synthetic resin plates or the like by deposition may be used as the shield plates 27.

Also, as shown in FIG. 1, as well as elsewhere, the shield plates 27 are provided at left and right end portions thereof with insertion guide portions 29 formed of a stepped-portion extending from the front end to the rear end thereof.

Accordingly, the upper surface plate 19 and the lower surface plate 20 of the thin and flat type insulative case 11 are also provided at left and right lug portions thereof with insertion guide portions formed of a stepped-portion extending from the front end to the rear end thereof. Both of the insertion guide portions are overlapped with each other, and a guide surface for guiding the flat and insulative case 11 into the inlet port 5 of the electronic device 4 is formed by the outer surfaces of the insertion guide portions 29.

By inserting a memory card into the connector body and then inserting the connector body with the memory card inserted therein into the electronic device, data recorded in the memory card can be given to the electronic device. Also, the data stored in the electronic device can be stored in the memory card, and the memory card can be replaced as often as required.

Users may own as many memory cards as desired and a single connector body. By selectively inserting one of the memory cards into the connector and then inserting the connector into the electronic device, the users can add desired functions to the electronic device.

Also, according to an assembly construction of the card-in type connector, the insulative case, the wiring board and the connecting device can be appropriately assembled in a planar arrangement and in correct relative position by the left and right cantilever arms. Thus, workability for assembling and connecting those three component members can be improved while fulfilling the requirement for making the card-in type connector thinner in size.

Also, the electronic part on the wiring board, in particular, can be protected by the cantilever arms. Further, the arms can be used as ribs for reinforcing the shield plates. Covered by the shield plates, the electronic part can effectively be protected from various troubles caused by mechanical impacts and static electricity.

Furthermore, there can be obtained favorable heat radiation from the upper and lower surfaces of the wiring board owing to the above-mentioned arrangement. Thus, the present invention proves itself effective as a protective countermeasure for an electronic device against heat. In addition, since the contacts for contacting the card and the contacts for connecting an electronic device of a connecting device can be soldered from the same open surface side of the wiring board, connecting work can easily be carried out.

What is claimed is:

1. A card-in type connector adapted to receive a memory card having at least one lead and adapted to be inserted into an electronic device having a connecting portion, said card-in type connector comprising:

a thin and flat type insulative case into which the memory card can be removably inserted, said insulative case having a front end and a rear end;

a pair of spaced apart, parallel cantilever arms extending forwardly from a distal end of said insulative case;

a wiring board interposed between said cantilever arms;

a connecting device interposed between front end portions of said cantilever arms, said connecting device having at least one connecting contact connected to said wiring board;

at least one elongated memory card contact disposed in said insulative case and having a front end and a rear end, said front end of said elongated memory card contact comprising a terminal piece connected to said wiring board, and said rear end of said elongated memory card contact comprising a pressure contacting portion for contacting the lead of the memory card; and a memory card tray movably mounted in said insulative case for movement between a rearward, memory card-insertion position and a forward, memory card-use position in which said pressure contacting portion of said elongated memory card contact protrudes from one side of said memory card tray to contact the lead of the memory card when the memory card is inserted on the other side of said memory card tray.

2. A card-in type connector as recited in claim 1, wherein said memory card tray has a contact port formed therethrough, and said pressure contacting portion of said elongated memory card contact protrudes through said contact port when said memory card tray is in said forward, memory card-use position.

3. A card-in type connector as recited in claim 1, wherein each of said cantilever arms includes, at a front end portion thereof, a connecting device engagement portion which engages with said connecting device and prevents forward and rearward movement of said connecting device.

4. A card-in type connector as recited in claim 1, further comprising the memory card having the at least one lead; and wherein said at least one lead of said memory card is intimately attached at one of upper and lower surfaces of said memory card.

5. A card-in type connector as recited in claim 1, further comprising upper and lower shield plates covering upper and lower surfaces of said insulative case, respectively;

wherein said wiring board and said connecting device are disposed between and covered by said upper and lower shield plates; and wherein side portions of said upper and lower shield plates constitute reinforcement portions, and said cantilever arms are interposed between and reinforced by said reinforcement portions.

6. A card-in type connector as recited in claim 5, wherein each of said cantilever arms has an elongated slit formed in each of its upper and lower surfaces; and side edge portions of said upper and lower shield plates are respectively fitted in said elongated slits.

\* \* \* \* \*